United States Patent
Zhou et al.

(10) Patent No.: US 8,765,016 B2
(45) Date of Patent: Jul. 1, 2014

(54) GREEN LUMINESCENT MATERIAL OF TERBIUM DOPED GADOLINIUM BORATE AND PREPARING METHOD THEREOF

(75) Inventors: Mingjie Zhou, Shenzhen (CN); Xiaofang Liang, Shenzhen (CN); Jun Liu, Shenzhen (CN); Qiurong Liao, Shenzhen (CN)

(73) Assignee: Ocean's King Lighting Science & Technology Co., Ltd., Shenzhen, Guangdong (CN)

( * ) Notice: Subject to any disclaimer, the term of this patent is extended or adjusted under 35 U.S.C. 154(b) by 130 days.

(21) Appl. No.: 13/574,409

(22) PCT Filed: Feb. 26, 2010

(86) PCT No.: PCT/CN2010/070776
§ 371 (c)(1),
(2), (4) Date: Jul. 20, 2012

(87) PCT Pub. No.: WO2011/103721
PCT Pub. Date: Sep. 1, 2011

(65) Prior Publication Data
US 2012/0286206 A1 Nov. 15, 2012

(51) Int. Cl.
*C09K 11/77* (2006.01)
(52) U.S. Cl.
CPC .................. *C09K 11/778* (2013.01)
USPC ................................................. 252/301.4 R
(58) Field of Classification Search
CPC ....................................................... C09K 11/778
USPC ................................................. 252/301.4 R
See application file for complete search history.

(56) References Cited

U.S. PATENT DOCUMENTS 4,926,091 A * 5/1990 Verlijsdonk et al. .......... 313/486
6,090,310 A 7/2000 Rao et al.

FOREIGN PATENT DOCUMENTS

EP 0358278 B1 4/1993
JP 02113087 A 4/1990

* cited by examiner

*Primary Examiner* — Carol M Koslow
(74) *Attorney, Agent, or Firm* — Shimokaji & Associates P.C.

(57) ABSTRACT

A green luminescent material of terbium doped gadolinium borate is provided. The luminescent material has a formula of $M_3Gd_{1-x}Tb_x(BO_3)_3$, wherein, M is alkaline earth metal element and x is 0.005-0.5. The method for preparing the luminescent material comprises the following steps: selecting the source compounds of alkaline earth metal ion, boric acid radical ion ($BO_3^{3-}$), $Gd^{3+}$ and $Tb^{3+}$ by the stoichiometric ratio, wherein, the stoichiometric ratio is the molar ratio of the corresponding element in the formula of $M_3Gd_{1-x}Tb_x(BO_3)_3$, and the source compound of $BO_3^{3-}$ is over 10%-30% by the molar ratio; mixing; pre-treatment by sintering; cooling; grinding; calcination; and cooling to obtain the luminescent material.

7 Claims, 4 Drawing Sheets

GREEN LUMINESCENT MATERIAL OF TERBIUM DOPED GADOLINIUM BORATE AND PREPARING METHOD THEREOF

FIELD OF THE INVENTION

The present disclosure relates to luminescent materials, especially to a green luminescent material of terbium doped gadolinium borate which excited by vacuum ultraviolet light and a preparing method thereof.

BACKGROUND OF THE INVENTION

Compared to the CRT display and the LCD display, the plasma panel display (PDP) has a lot of outstanding features, such as, broad angular field of view, large areas, high speed of response, and colors non-distortion. The PDP can be used to produce large size displays, which is optimal to wall type TVs. Without mercury that is poisonous to human, mercury-free fluorescence lamps have significant meanings to environment protection in comparison with the common high-voltage mercury lamps and low-voltage mercury lamps. In a PDP display, the circuit and luminescent material therein may be key techniques for displaying. Selecting luminescent material is the most important techniques in displays. Accordingly, study of tricolor fluorescence powders used as luminescent materials in the PDP is essential. Recently, the most widely used tricolor fluorescence powders include red powders such as $Y_2O_3$:$Eu^{3+}$ and $(Y,Gd)BO_3$:$Eu^{3+}$, green powders such as $Zn_2SiO_4$:$Mn^{2+}$ and $BaAl_{12}O_{19}$:$Mn^{2+}$, and blue powders such as $BaMgAl_{10}O_{17}$:$Eu^{2+}$. For the commercial green powder $Zn_2SiO_4$:$Mn^{2+}$, a spin forbidden ($^4T_1 \rightarrow {}^6A_1$) emission of the $Mn^{2+}$ therein resulting in prolonging the afterglow time of the material, which is not beneficial to the display of rapidly moving images of TVs and is not suitable for TV displays. An increasing of doping concentration of the $Mn^{2+}$ can shorten the afterglow time, however, the luminescence intensity of the material is reduced. So, it is necessary to develop a new, efficient green luminescent material with short afterglow time Now the studies of luminescent material of gadolinium borate $M_3Gd(BO_3)_3$ (M=Ca, Sr, Ba) mainly focus on its laser characteristics when being doped in rare earth elements as a mono-crystal. In contrast, the researches of that in excitation under vacuum ultraviolet light are less. Compared to the long afterglow of the $Mn^{2+}$, the $Tb^{3+}$ has a characteristic emission of green light (540-545 nm), and the spin coupling of the $Tb^{3+}$ has a shielding affect to the spin forbidden of the $Tb^{3+}$, which endows it with shorter afterglow time and overcomes hysteresis effect.

Accordingly, to overcome the disadvantage of long afterglow time, and to meet the requirement of color displaying and green illumination, a new green luminescent material which has a short afterglow time should be developed and be applied in plasma panel display (PDP) or mercury-free fluorescence lamps.

SUMMARY OF THE INVENTION

The technical problem of the present invention to be solved is to provide a green luminescent material of terbium doped gadolinium borate which has high luminescence intensity, and a preparing method for preparing the green luminescent material of terbium doped gadolinium borate.

The technical solution to solve the technical problem in the present invention is: providing a green luminescent material of terbium doped gadolinium borate, the green luminescent material of terbium doped gadolinium borate has a chemical formula of $M_3Gd_{1-x}Tb_x(BO_3)_3$, wherein, M is alkaline earth metal element, and x is 0.005-0.5. The said alkaline earth metal element M is at least one of calcium (Ca), strontium (Sr), and barium (Ba).

And, a preparing method for preparing the green luminescent material of terbium doped gadolinium borate comprises the following steps:

Step one, selecting the source compounds of alkaline earth metal ion, the source compounds of boric acid radical ion ($BO_3^{2-}$), the source compounds of $Gd^{3+}$, and the source compounds of $Tb^{3+}$ by the stoichiometric ratio, wherein, the stoichiometric ratio is the molar ratio of the corresponding element in the formula of $M_3Gd_{1-x}Tb_x(BO_3)_3$, and the source compound of $BO_3^{2-}$ is over 10%-30% by the molar ratio; M is alkaline earth metal element, and x is 0.005-0.5;

Step two, mixing each compound;

Step three, pre-treating the mixture by sintering and then cooling the mixture;

Step four, grinding the sintered matter, calcining the grinded matter in reducing atmosphere and then cooling to get the green luminescent material of terbium doped gadolinium borate.

In the preparing method of the present invention, the source compound of the alkaline earth metal element is at least one of alkaline earth oxide, alkaline earth hydroxide, alkaline earth nitrate, and alkaline earth carbonate. The source compound of the boric acid radical ion is at least one of boric acid and boric oxide. The source compound of $Gd^{3+}$ is $Gd^{3+}$ contained rare earth oxide or $Gd^{3+}$ contained nitrate. The source compound of $Tb^{3+}$ is $Tb^{3+}$ contained rare earth oxide or $Tb^{3+}$ contained nitrate.

In the preparing method of the present invention, the compounds are mixed with fluxing agents.

In the preparing method of the present invention, the fluxing agent is at least one of the boric acid and barium fluoride.

In the preparing method of the present invention, pre-treatment by sintering is carried out at the temperature in a range of 200-700° C. for 2 hours to 7 hours.

In the preparing method of the present invention, calcining the grinded matter is carried out at the temperature in a range of 900-1100° C. for 3 hours to 24 hours.

In the preparing method of the present invention, the source compound of boric acid radical ion is over 10%-20% by the molar ratio.

In the preparing method of the present invention, the reducing atmosphere is gas mixture of $N_2$ and $H_2$, $H_2$, or carbon monoxide.

The luminescent material of the present invention has a matrix of $M_3Gd_{1-x}Tb_x(BO_3)_3$. The $M_3Gd_{1-x}Tb_x(BO_3)_3$ has a strong absorption of the 150 nm-175 nm vacuum ultraviolet light (VUV), and transits the energy to the Gd ions. There is an energy transition between the $Gd^{3+}$ $^6P_J$ energy levels and the $Tb^{3+}$, after the energy absorption of $Tb^{3+}$, it emits green photons by f-f transition radiation. The energy transition process between the $Gd^{3+}$ $^6P_J$ energy levels and the $Tb^{3+}$ enhances the green light emission intensity of the $Tb^{3+}$. Compared to the existing technology, the luminescent materials of the present invention have the following advantages: 1. $Gd^{3+}$ contained in the gadolinium borate $M_3Gd(BO_3)_3$ (M=Ca, Sr, Ba) is a framework structure of the $M_3Gd(BO_3)_3$, there is energy transition between the $Gd^{3+}$ and the $Tb^{3+}$, which can improve the green light emission intensity of the $Tb^{3+}$; 2. compared to the long afterglow time of $Mn^{2+}$, the $Tb^{3+}$ has characteristic green light emission (540-545 nm), and the spin coupling of the $Tb^{3+}$ has a shielding affect to the spin forbidden of the $Tb^{3+}$, which endows it with shorter afterglow time and overcomes hysteresis effect.

In the preparing method for preparing the green luminescent material of terbium doped gadolinium borate, by sintering treatment and calcining treatment, the luminescent materials can be obtained, which makes the process simple, low cost, and have broad producing and applying prospect.

BRIEF DESCRIPTION OF THE DRAWINGS

Further description of the present invention will be illustrated, which combined with drawings and embodiments in the drawings.

DETAILED DESCRIPTION OF ILLUSTRATED EMBODIMENTS

The examples hereinafter described merely being preferred or exemplary embodiment of the disclosure. It will be apparent that various changes may be made thereto without departing from the spirit and scope of the disclosure.

According to an embodiment of a green luminescent material of terbium doped gadolinium borate, the green luminescent material of terbium doped gadolinium borate has a chemical formula of $M_3Gd_{1-x}Tb_x(BO_3)_3$, wherein, M is alkaline earth metal element, and x is 0.005-0.5.

The green luminescent material of terbium doped gadolinium borate taking $M_3Gd(BO_3)_3$ as the matrix and doped luminescent ion $Tb^{2+}$, where the mechanism is: Through the strong absorption of the 150 nm-175 nm vacuum ultraviolet light (VUV), energy is transmitted to the Gd ions. There is an energy transition between the $Gd^{3+6}P_J$ energy levels and the $Tb^{3+}$, after the energy absorption of $Tb^{3+}$, it emits green photons by f-f transition radiation. The energy transition process between the $Gd^{3+6}P_J$ energy levels and the $Tb^{3+}$ enhances the green light emission intensity of the $Tb^{3+}$.

Figure 1:
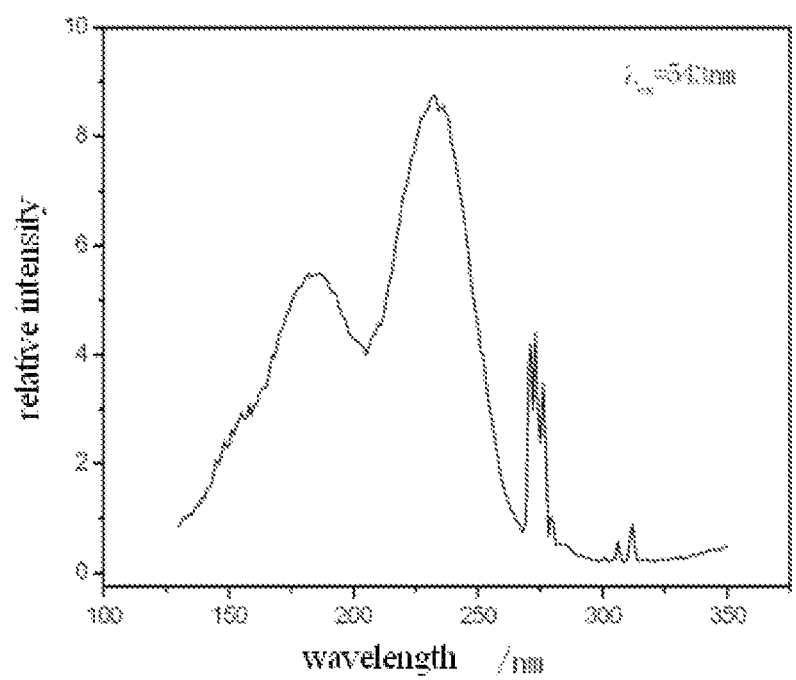
FIG. 1 shows an excitation spectrum of the luminescent material of $Sr_3Gd_{0.85}Tb_{0.15}(BO_3)_3$ of example 1, the excitation spectrum is tested under a monitoring wavelength of 543 nm.

Referring to FIG. 1, the strong absorption peak at the vacuum ultraviolet wave band of 150-200 nm is an absorption peak of the matrix. The luminescent material of example 1 has a strong absorption at the vacuum ultraviolet wave band, which can effectively transit the energy to the $Gd^{3+}$, achieve an energy transition between Gd—Tb, and enhance the characteristic emission intensity of the $Tb^{3+}$ at 543 nm.

Figure 2:
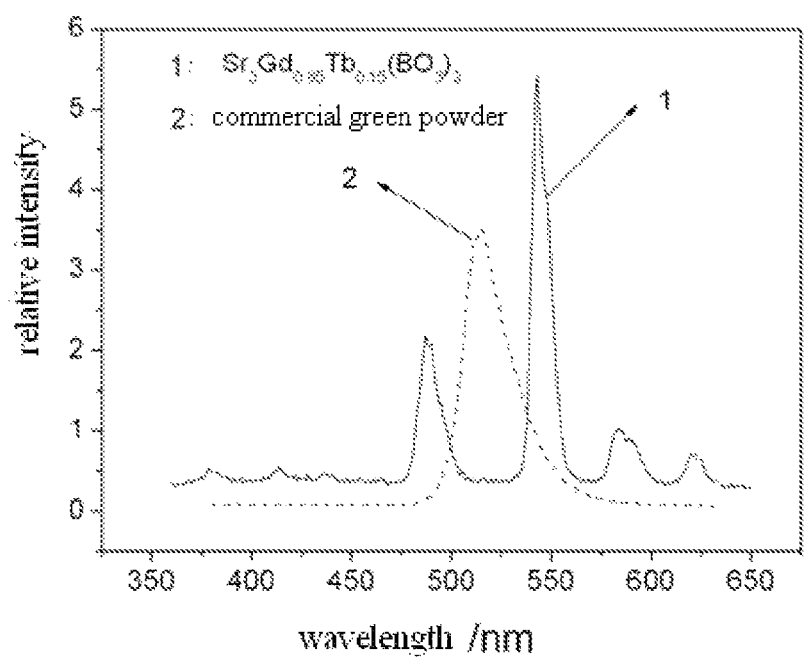
FIG. 2 shows emission spectrums of the luminescent material of $Sr_3Gd_{0.85}Tb_{0.15}(BO_3)_3$ of example 1 and a commercial $BaAl_{12}O_{19}:Mn^{2+}$, the emission spectrums are tested under an excitation wavelength of 172 nm.

Referring to FIG. 2, the curve 1 shows an emission spectrum of $Sr_3Gd_{0.85}Tb_{0.15}(BO_3)_3$ under an excitation wavelength of 172 nm, the curve 2 shows an emission spectrum of commercial green powder $BaAl_{12}O_{19}:Mn^{2+}$ under an excitation wavelength of 172 nm. Obviously, the intensity of the emission peak of the $Sr_3Gd_{0.85}Tb_{0.15}(BO_3)_3$ at 543 nm is greater than the intensity of the emission peak of the commercial green powder $BaAl_{12}O_{19}:Mn^{2+}$ at 525 nm. The intensity of the emission peak of the $Sr_3Gd_{0.85}Tb_{0.15}(BO_3)_3$ of example 1 at 543 nm is 1.8 times to that of the commercial powder $BaAl_{12}O_{19}:Mn^{2+}$. The luminescent material of example 1 has a high effect, and a short afterglow time, which overcomes hysteresis effect. The $Tb^{3+}$ doped in the green luminescent material of gadolinium borate at least has the following advantages: (1) $Gd^{3+}$ contained in the gadolinium borate $M_3Gd(BO_3)_3$ (M=Ca, Sr, Ba) is a framework structure of the $M_3Gd(BO_3)_3$, there is energy transition between the $Gd^{3+}$—$Tb^{3+}$, which can improve the green light emission intensity of the $Tb^{3+}$; (2) compared to the long afterglow time of $Mn^{2+}$, the $Tb^{3+}$ has characteristic green light emission (540-545 nm), and the spin coupling of the $Tb^{3+}$ has a shielding affect to the spin forbidden of the $Tb^{3+}$, which endows it with shorter afterglow time and overcomes hysteresis effect.

Figure 4:
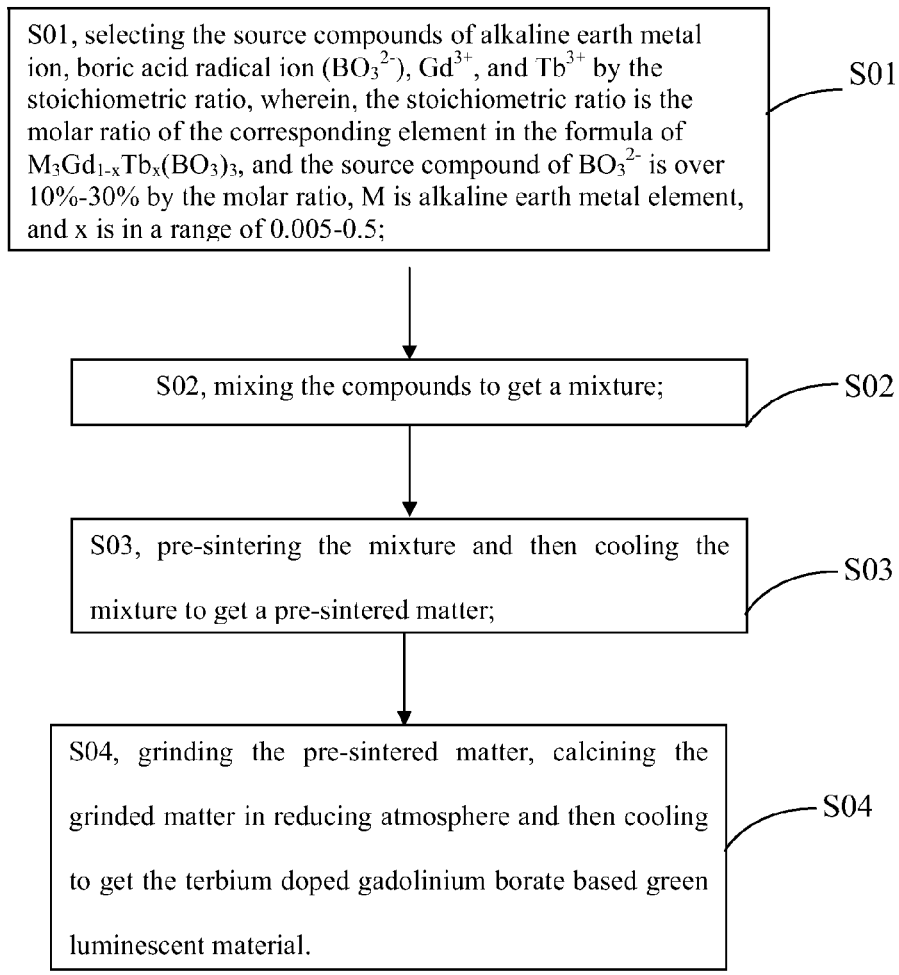
FIG. 4 shows a flow chat for preparing the green luminescent material of terbium doped gadolinium borate.

Referring to FIG. 4, a flow chart of a preparing method for preparing the green luminescent material of terbium doped gadolinium borate includes the following steps:

S01, selecting the source compounds of alkaline earth metal ion, the source compounds of boric acid radical ion ($BO_3^{2-}$), the source compounds of $Gd^{3+}$, and the source compounds of $Tb^{3+}$ by the stoichiometric ratio, wherein, the stoichiometric ratio is the molar ratio of the corresponding element in the formula of $M_3Gd_{1-x}Tb_x(BO_3)_3$, and the source compound of $BO_3^{2-}$ is over 10%-30% by the molar ratio, preferably, the source compound of $BO_3^{2-}$ is over 10%-20% by the molar ratio, M is alkaline earth metal element, the alkaline earth metal element M is at least one of the Ca, Sr, and Ba, and x is 0.005-0.5;

S02, mixing each compound;

S03, pre-treating the mixture by sintering and then cooling the mixture;

S04, grinding the sintered matter, calcining the grinded matter in reducing atmosphere and then cooling to get the green luminescent material of terbium doped gadolinium borate.

In the step of S01, the source compound of the alkaline earth metal element is at least one of alkaline earth oxide, alkaline earth hydroxide, alkaline earth nitrate, and alkaline earth carbonate. The source compound of the boric acid radical ion is at least one of boric acid and boric oxide. The source compound of $Gd^{3+}$ is $Gd^{3+}$ contained rare earth oxide or $Gd^{3+}$ contained nitrate. The source compound of $Tb^{3+}$ is $Tb^{3+}$ contained rare earth oxide or $Tb^{3+}$ contained nitrate.

In the step of S02, the compounds are even mixed with a little fluxing agent, the fluxing agent is one or two elements selected from the group consisting of boric acid and barium fluoride.

In the step of S03, pre-treatment by sintering is carried out at the temperature in a range of 200-700° C. for 2 hours to 7 hours, and then cooled to room temperature.

In the step of S04, calcining the grinded matter is carried out at the temperature in a range of 900-1100° C. for 3 hours to 24 hours in a box type high temperature furnace, and then cooled to room temperature. The reducing atmosphere is gas mixture of $N_2$ and $H_2$, $H_2$, or carbon monoxide.

Special examples are disclosed as follows to demonstrate the green luminescent material of terbium doped gadolinium borate and preparing method thereof.

Example 1

2.2145 gram (g) strontium carbonate ($SrCO_3$), 0.7703 g gadolinium oxide ($Gd_2O_3$), 1.0666 g boric acid ($H_3BO_3$) (calculated by over 15% of the molar equivalence of the boron element contained in the products. The follows have the same calculation), 0.1402 g terbium oxide ($Tb_4O_7$), and 0.0438 g barium fluoride ($BaF_2$) (weigh by 5% of the molar ratio to the products, the follows are the same) are provided and completely grinded in an agate mortar. The grinded matter is pre-treated by sintering in a corundum crucible at 500° C. for 2 hours (h), and then cooled to room temperature. The cooled sintered matter is completely grinded once more. Finally, calcining at 1000° C. for 5 h in gas mixture of $N_2$ and $H_2$ ($H_2$ takes 5%), cooling, removing to be grinded to obtain green fluorescent luminescent material of $Sr_3Gd_{0.85}Tb_{0.15}(BO_3)_3$. In the present preparing method, barium fluoride acts as a fluxing agent, which cannot enter the crystal lattice, and do not affect the structure and compositions of the final product $Sr_3Gd_{0.85}Tb_{0.15}(BO_3)_3$ green fluorescent luminescent materials.

Example 2

3.9201 g barium nitrate ($Ba(NO_3)$), 0.9017 g gadolinium oxide ($Gd_2O_3$), 1.2057 g boric acid ($H_3BO_3$) (over 15%), 0.0047 g terbium oxide ($Tb_4O_7$), and 0.0438 g barium fluoride ($BaF_2$) (5%) are provided and completely grinded in an agate mortar. The grinded matter is pre-treated by sintering in a corundum crucible at 200° C. for 2 h, and then cooled to room temperature. The cooled sintered matter is completely grinded once more. Finally, calcining at 900° C. for 5 h in gas mixture of $N_2$ and $H_2$ ($H_2$ takes 5%), cooling, removing to be grinded to obtain green fluorescent luminescent material of $Ba_3Gd_{0.995}Tb_{0.005}(BO_3)_3$.

Example 3

2.9600 g barium carbonate ($BaCO_3$), 2.1434 g gadolinium nitrate $Gd(NO_3)_3 \cdot 6H_2O$, 1.0202 g boric acid ($H_3BO_3$) (over 10%), 0.0467 g terbium oxide ($Tb_4O_7$), and 0.0438 g barium fluoride ($BaF_2$) (5%) are provided and completely grinded in an agate mortar. The grinded matter is pre-treated by sintering in a corundum crucible at 700° C. for 2 h, and then cooled to room temperature. The cooled sintered matter is completely grinded once more. Finally, calcining at 1100° C. for 10 h in reducing gas of CO, cooling, removing to be grinded to obtain green fluorescent luminescent material of $Ba_3Gd_{0.95}Tb_{0.05}(BO_3)_3$.

Example 4

1.1114 g calcium hydroxide ($Ca(OH)_2$), 0.6344 g gadolinium oxide ($Gd_2O_3$), 1.0202 g boric acid ($H_3BO_3$) (over 10%), and 0.2804 g terbium oxide ($Tb_4O_7$) are provided and completely grinded in an agate mortar. The grinded matter is pre-treated by sintering in a corundum crucible at 600° C. for 2 h, and then cooled to room temperature. The cooled sintered matter is completely grinded once more. Finally, calcining at 1000° C. for 24 h in reducing gas of CO, cooling, removing to be grinded to obtain green fluorescent luminescent material of $Ca_3Gd_{0.7}Tb_{0.3}(BO_3)_3$.

Example 5

2.1407 g strontium carbonate ($SrCO_3$), 0.0370 g calcium hydroxide ($Ca(OH)_2$), 0.7703 g gadolinium oxide ($Gd_2O_3$), 1.0202 g boric acid ($H_3BO_3$) (over 10%), 0.1402 g terbium oxide ($Tb_4O_7$), and 0.0438 g barium fluoride ($BaF_2$) (5%) are provided and completely grinded in an agate mortar. The grinded matter is pre-treated by sintering in a corundum crucible at 700° C. for 2 h, and then cooled to room temperature. The cooled sintered matter is completely grinded once more. Finally, calcining at 1000° C. for 12 h in gas mixture of $N_2$ and $H_2$ ($H_2$ takes 5%), cooling, removing to be grinded to obtain green fluorescent luminescent material of $Sr_3Ca_{0.1}Gd_{0.85}Tb_{0.15}(BO_3)_3$.

Example 6

2.0669 g strontium carbonate ($SrCO_3$), 0.0370 g calcium hydroxide ($Ca(OH)_2$), 0.0987 g barium carbonate ($BaCO_3$), 0.4531 g gadolinium oxide ($Gd_2O_3$), 1.0666 g boric acid ($H_3BO_3$) (over 15%), 0.4673 g terbium oxide ($Tb_4O_7$), and 0.0438 g barium fluoride ($BaF_2$) (5%) are provided and completely grinded in an agate mortar. The grinded matter is pre-treated by sintering in a corundum crucible at 700° C. for 2 h, and then cooled to room temperature. The cooled sintered matter is completely grinded once more. Finally, calcining at 1000° C. for 24 h in reducing gas of $H_2$, cooling, removing to be grinded to obtain green fluorescent luminescent material of $Sr_{2.8}Ca_{0.1}Ba_{0.1}Gd_{0.5}Tb_{0.5}(BO_3)_3$.

Comparison Example 1

2.2145 g strontium carbonate ($SrCO_3$), 0.4795 g yttrium oxide ($Y_2O_3$), 1.0666 g boric acid ($H_3BO_3$) (over 15%), 0.1402 g terbium oxide ($Tb_4O_7$), and 0.0438 g barium fluoride ($BaF_2$) (5%) are provided and completely grinded in an agate mortar. The grinded matter is pre-treated by sintering in a corundum crucible at 500° C. for 2 h, and then cooled to room temperature. The cooled sintered matter is completely grinded once more. Finally, calcining at 1000° C. for 5 h in reducing gas mixture of $N_2$ and $H_2$ ($H_2$ takes 5%), cooling, removing to be grinded to obtain green fluorescent luminescent material of $Sr_3Y_{0.85}Tb_{0.15}(BO_3)_3$.

Comparison Example 2

1.5013 g barium carbonate ($BaCO_3$), 0.7738 g lanthanum oxide ($La_2O_3$), 1.0202 g boric acid ($H_3BO_3$) (over 10%), 0.0467 g terbium oxide ($Tb_4O_7$), and 0.0438 g barium fluoride ($BaF_2$) (5%) are provided and completely grinded in an agate mortar. The grinded matter is pre-treated by sintering in a corundum crucible at 500° C. for 2 h, and then cooled to room temperature. The cooled sintered matter is completely grinded once more. Finally, calcining at 1100° C. for 5 h in reducing gas of CO, cooling, removing to be grinded to obtain green fluorescent luminescent material of $Ba_3La_{0.95}Tb_{0.05}(BO_3)_3$.

COMPARISON EXAMPLE 3

1.5013 g calcium carbonate ($CaCO_3$), 0.7250 g gadolinium oxide ($Gd_2O_3$), 0.0815 g lanthanum oxide ($La_2O_3$), 1.0202 g boric acid ($H_3BO_3$) (over 10%), 0.0934 g terbium oxide ($Tb_4O_7$), and 0.0438 g barium fluoride ($BaF_2$) (5%) are provided and completely grinded in an agate mortar. The grinded matter is pre-treated by sintering in a corundum crucible at 600° C. for 2 h, and then cooled to room temperature. The cooled sintered matter is completely grinded once more. Finally, calcining at 1000° C. for 10 h in reducing gas of CO, cooling, removing to be grinded to obtain green fluorescent luminescent material of $Ca_3Gd_{0.8}La_{0.1}Tb_{0.1}(BO_3)_3$.

Figure 3:
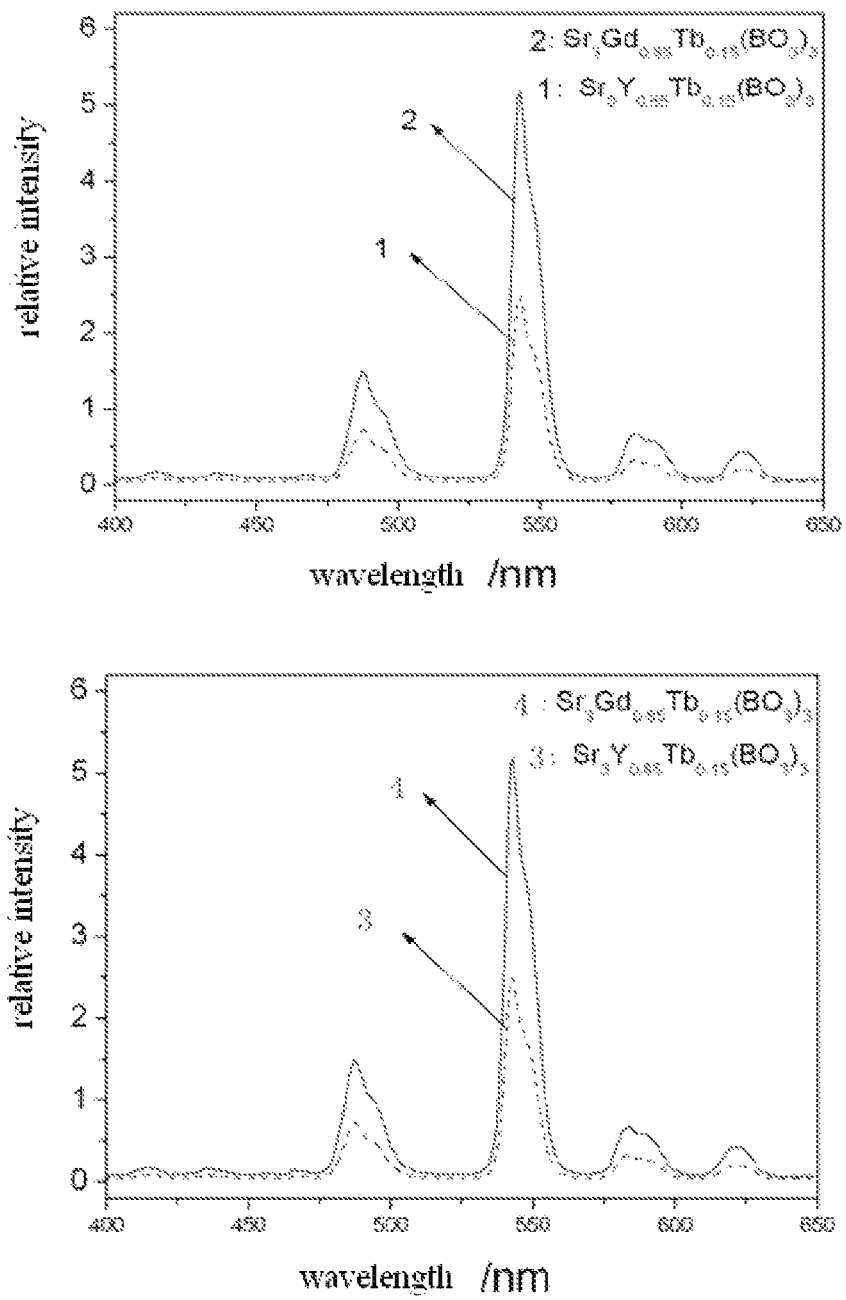
FIG. 3 shows emission spectrums of the luminescent material of $Sr_3Gd_{0.85}Tb_{0.15}(BO_3)_3$ of example 1 and the luminescent material of $Sr_3Y_{0.85}Tb_{0.15}(BO_3)_3$ of comparison example 1, the emission spectrums are tested under an excitation wavelength of 172 nm.

$Gd^{3+}$ contained in the gadolinium borate $M_3Gd(BO_3)_3$ (M=Ca, Sr, Ba) of examples 1-6 is a framework structure of the $M_3Gd(BO_3)_3$, there is energy transition between the $Gd^{3+}$—$Tb^{3+}$, which can improve the green light emission intensity of the $Tb^{3+}$. While in the comparison examples 1-3, there is no energy transition between the $Ln^{3+}$—$Tb^{3+}$ of borate $MLn(BO_3)_3$ (M=Ca, Sr, Ba; Ln=La, Y etc.). Compared to the $M_3Gd(BO_3)_3$ (M=Ca, Sr, Ba), under the excitation of vacuum ultraviolet light, the $MLn(BO_3)_3$ (M=Ca, Sr, Ba; Ln=La, Y etc.) doped with $Tb^{3+}$ has a lower luminescence intensity, shown in FIG. 3. The curve 3 shows an emission spectrum of the luminescent material of $Sr_3Y_{0.85}Tb_{0.15}(BO_3)_3$ under an excitation wavelength of 172 nm, the curve 4 shows an emission spectrum of the luminescent material of $Sr_3Gd_{0.85}Tb_{0.15}(BO_3)_3$ under an excitation wavelength of 172 nm.

In the green luminescent material of terbium doped gadolinium borate mentioned above, Through the strong absorption of the 150 nm-175 nm vacuum ultraviolet light (VUV) by matrix $M_3Gd_{1-x}Tb_x(BO_3)_3$, energy is transmitted to the Gd ions. There is an energy transition between the $Gd^{3+6}P_J$ energy levels and the $Tb^{3+}$, after the energy absorption of $Tb^{3+}$, it emits green photons by f-f transition radiation. The energy transition process between the $Gd^{3+6}P_J$ energy levels and the $Tb^{3+}$ enhances the green light emission intensity of the $Tb^{3+}$.

Compared to the existing technology, the luminescent material of the present invention has the following advantages: 1. $Gd^{3+}$ contained in the gadolinium borate $M_3Gd(BO_3)_3$ (M=Ca, Sr, Ba) is a framework structure of the $M_3Gd(BO_3)_3$, there is energy transition between the $Gd^{3+}$—$Tb^{3+}$, which can improve the green light emission intensity of the $Tb^{3+}$; 2. compared to the long afterglow time OF $Mn^{2+}$, the $Tb^{3+}$ has characteristic green light emission (540-545 nm), and the spin coupling of the $Tb^{3+}$ has a shielding affect to the spin forbidden of the $Tb^{3+}$, which endows it with shorter afterglow time and overcomes hysteresis effect.

In the preparing method for preparing the green luminescent material of terbium doped gadolinium borate mentioned above, by pre-treatment by sintering and calcining treatment, the luminescent material can be obtained, which makes the preparation process simple, low cost, and have broad applying prospect.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A preparing method for making a green luminescent material of terbium doped gadolinium borate, comprising the following steps:
   step one, selecting the source compounds of alkaline earth metal ion, boric acid radical ion ($BO_3^{2-}$), $Gd^{3+}$, and $Tb^{3+}$ by the stoichiometric ratio, wherein, the stoichiometric ratio is the molar ratio of the corresponding element in the formula of $M_3Gd_{1-x}Tb_x(BO_3)_3$, and the source compound of $BO_3^+$ is over 10%-30% by the molar ratio, M is alkaline earth metal element, and x is 0.005-0.5;
   step two, mixing each compound;
   step three, pre-treating the mixture by sintering and then cooling the mixture;
   step four, grinding the sintered matter, calcining the grinded matter in reducing atmosphere and then cooling to get the green luminescent material of terbium doped gadolinium borate;
   wherein the compounds are even mixed with fluxing agents.

2. The preparing method for making a green luminescent material of terbium doped gadolinium borate according to claim 1, wherein the source compound of the alkaline earth metal element is at least one of alkaline earth oxide, alkaline earth hydroxide, alkaline earth nitrate, and alkaline earth carbonate; the source compound of the boric acid radical ion is at least one of boric acid and boric oxide; the source compound of $Gd^{3+}$ is $Gd^{3+}$ contained rare earth oxide or $Gd^{3+}$ contained nitrate; the source compound of $Tb^{3+}$ is $Tb^{3+}$ contained rare earth oxide or $Tb^{3+}$ contained nitrate.

3. The preparing method for making a green luminescent material of terbium doped gadolinium borate according to claim 1, wherein the fluxing agent is selected from one or more elements of the group consisting of boric acid and barium fluoride.

4. The preparing method for making a green luminescent material of terbium doped gadolinium borate according to claim 1, wherein the source compound of $BO_3^{2-}$ is over 10%-20% by the molar ratio.

5. The preparing method for making a green luminescent material of terbium doped gadolinium borate according to claim 1, wherein the reducing atmosphere is gas mixture of $N_2$ and $H_2$, $H_2$, or carbon monoxide.

6. A preparing method for making a green luminescent material of terbium doped gadolinium borate, comprising the following steps:
   step one, selecting the source compounds of alkaline earth metal ion, boric acid radical ion ($BO_3^{2-}$), $Gd^{3+}$, and $Tb^{3+}$ by the stoichiometric ratio, wherein, the stoichiometric ratio is the molar ratio of the corresponding element in the formula of $M_3Gd_{1-x}Tb_x(BO_3)_3$, and the source compound of $BO_3^{2-}$ is over 10%-30% by the molar ratio, M is alkaline earth metal element, and x is 0.005-0.5;
   step two, mixing each compound;
   step three, pre-treating the mixture by sintering and then cooling the mixture;
   step four, grinding the sintered matter, calcining the grinded matter in reducing atmosphere and then cooling to get the green luminescent material of terbium doped gadolinium borate;
   wherein pre-treatment by sintering is carried out at the temperature in a range of 200-700° C. for 2 hours to 7 hours.

7. A preparing method for making a green luminescent material of terbium doped gadolinium borate, comprising the following steps:
   step one, selecting the source compounds of alkaline earth metal ion, boric acid radical ion ($BO_3^{2-}$), $Gd^{3+}$, and $Tb^{3+}$ by the stoichiometric ratio, wherein, the stoichiometric ratio is the molar ratio of the corresponding element in the formula of $M_3Gd_{1-x}Tb_x(BO_3)_3$, and the source compound of $BO_3^{2-}$ is over 10%-30% by the molar ratio, M is alkaline earth metal element, and x is 0.005-0.5;
   step two, mixing each compound;
   step three, pre-treating the mixture by sintering and then cooling the mixture;
   step four, grinding the sintered matter, calcining the grinded matter in reducing atmosphere and then cooling to get the green luminescent material of terbium doped gadolinium borate;
   wherein calcining the grinded matter is carried out at the temperature in a range of 900-1100° C. for 3 hours to 24 hours.

* * * * *